United States Patent [19]
Kuss et al.

[11] Patent Number: 5,092,181
[45] Date of Patent: Mar. 3, 1992

[54] METHOD AND APPARATUS FOR MEASURING GAS FLOW USING BUBBLE VOLUME

[75] Inventors: Mark L. Kuss, Lowell; James C. Young, Fayetteville, both of Ark.

[73] Assignee: The Board of Trustees of the University of Arkansas, Little Rock, Ark.

[21] Appl. No.: 541,756

[22] Filed: Jun. 21, 1990

[51] Int. Cl.⁵ ............................................ G01F 13/00
[52] U.S. Cl. ................................................. 73/861.41
[58] Field of Search ................................... 73/861.41

[56] References Cited

U.S. PATENT DOCUMENTS

| | | | |
|---|---|---|---|
| 2,333,791 | 11/1943 | Hutchinson, Jr. | 73/861.41 |
| 2,683,986 | 7/1954 | Bartlett et al. | 73/861.41 |
| 2,967,450 | 1/1961 | Shields et al. | 73/861.41 |

FOREIGN PATENT DOCUMENTS

| | | | |
|---|---|---|---|
| 0272700 | 10/1989 | Fed. Rep. of Germany | 73/861.41 |
| 495534 | 12/1975 | U.S.S.R. | 73/861.41 |
| 0640121 | 1/1979 | U.S.S.R. | 73/861.41 |

Primary Examiner—Herbert Goldstein
Attorney, Agent, or Firm—Hermann Ivester

[57] ABSTRACT

Method and apparatus for measuring minute gas flows and/or accumulations wherein a gas flow is bubbled through a defined path in separated form and a sensor is used to detect and count each bubble. The bubble count signal can be used to calculate gas accumulation, or to calculate gas flow rate if made during a defined time period, or to meter the flow of the gas to a point of utilization.

1 Claim, 1 Drawing Sheet

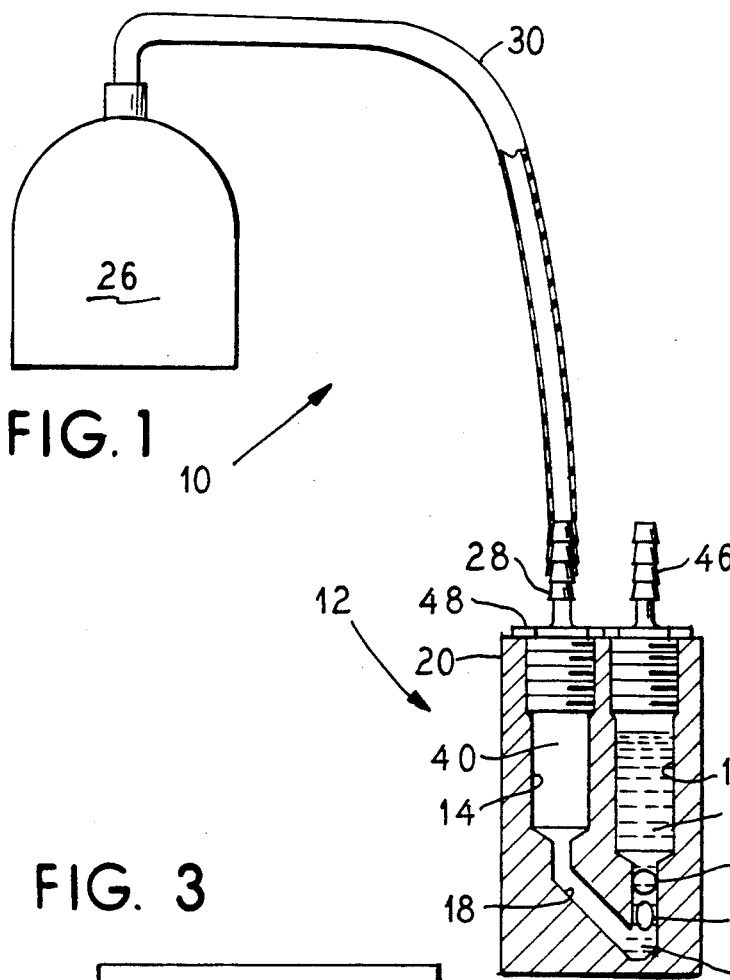
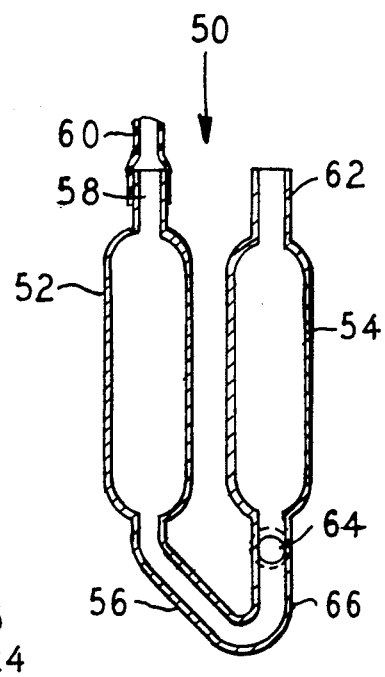
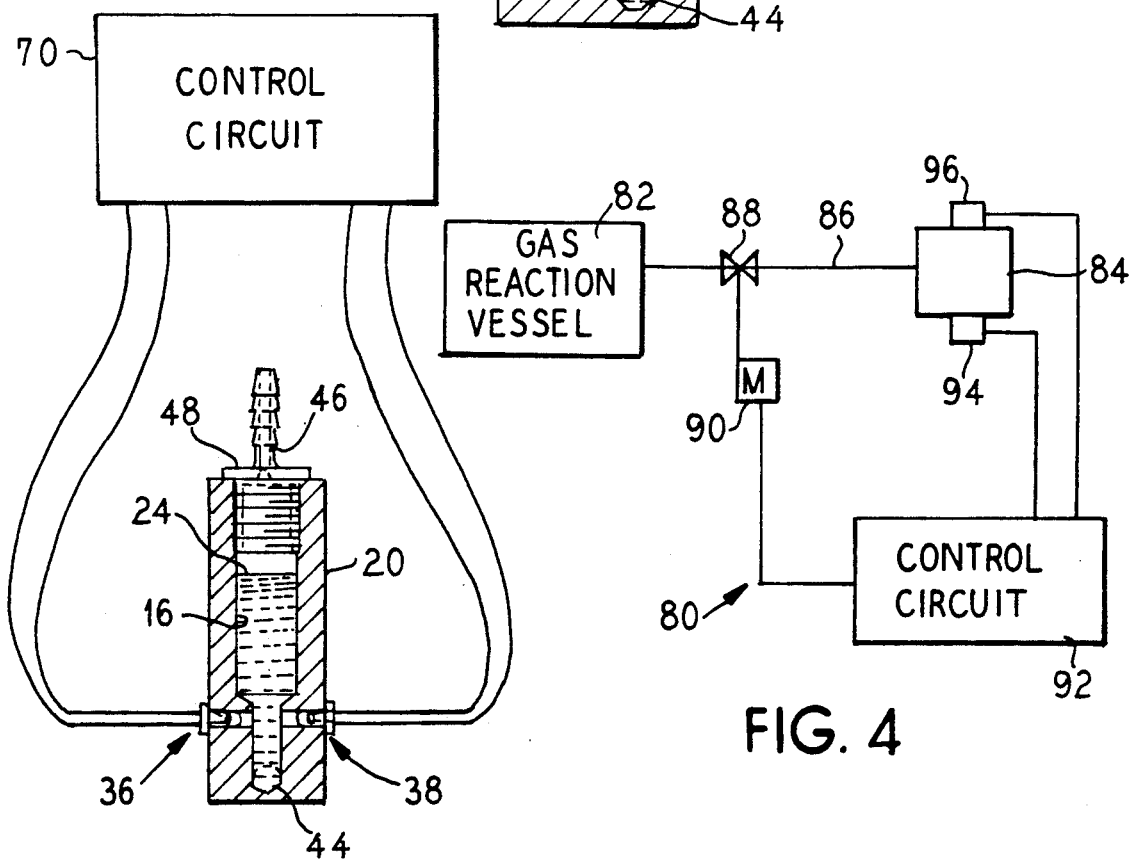

METHOD AND APPARATUS FOR MEASURING GAS FLOW USING BUBBLE VOLUME

BACKGROUND OF THE INVENTION

The present invention relates to methods and apparatus for measuring gas flow. More particularly, the invention is related to methods and apparatus for measuring gas flow volume and rate.

The ability to measure very small gas flow rates and/or gas volumes (such as, e.g., gas accumulations and consumptions) can be important in many applications. For example, such abilities can be important in investigations concerning biological and/or chemical reactions. Other applications can readily be imagined.

In measuring small gas flow volumes or rates, the challenge is to measure gas production or consumption on a continuous basis and/or in very small increments with the resulting measurements falling within acceptable accuracy and precision limits.

SUMMARY OF THE INVENTION

The present invention provides a method and an apparatus for reliably and relatively accurately measuring small gas flow rates and/or volumes on a continuous basis and/or in small increments. The resulting measurements fall within relatively narrow precision limits.

To these ends, the invention provides a method and an apparatus in which a gas flow is introduced into a volume of liquid in which gas bubbles of predictably determinable size are formed, whereupon the number of bubbles formed are counted to identify its gas flow volume or gas flow rate as a function of the number of bubbles counted per unit of time.

In one embodiment, the invention provides a method and apparatus in which gas bubbles are formed and passed through a controlled volume of liquid and a detector is used to count the number of bubbles. The number of bubbles (N) of known volume (V) passing through the controlled volume is a measure of gas flow volume, and as such, can represent a volume of gas that is produced, processed, or consumed. If a time period is selected, a gas flow rate can be calculated.

In another embodiment, the invention provides a gas flow cell using a conduit filled with a liquid. A flow of gas is introduced at one end of the conduit such that bubbles of the gas of substantially equal and predictable size are produced. A selected point is provided along the conduit at which point only one bubble of gas can pass at a time. A detector is used at that point to count the number of bubbles that pass thereby.

In still another embodiment, the invention provides a gas flow cell using two vertical, or nearly vertical, tubes which are interconnected near the lower ends thereof by means of a transfer tube. One vertical tube includes a bubble sensor. Both tubes are filled to a preset depth with a liquid.

Many different permutations of the structural details can be provided without departing from the basic principles of the invention. For example, the tubes may be formed in a solid block or the tubes may be formed from stock tubular materials.

The transfer tube may be sloped, horizontally oriented or inclined at a predetermined slope.

In one embodiment, the bubble detector comprises a light emitting source such as a light emitting diode (LED) and a light detector positioned on opposite sides of one tube. However, other means, such as sonar sources and detectors and mechanical devices, may be used to count bubbles.

The tubes may be filled with a non-volatile liquid.

One advantage of the invention is the ability to control the size and volume of the bubbles simply by selection of an appropriate liquid and level for the liquid.

Another advantage of the invention is the ability to calculate gas flow volumes and rates with great precision.

A particular advantage of the invention is the provision of a gas metering device which has the ability to measure flow volume or rate and to meter such flow with great precision.

These and other features and advantages will become more apparent with reference to the following detailed description of the presently preferred embodiments and accompanying drawings.

BRIEF DESCRIPTION OF THE DRAWINGS

FIG. 1 illustrates an apparatus for measuring gas flow volume or rate in accordance with this invention.

FIG. 2 is a cross-sectional view of an alternate apparatus for measuring gas flow volume or rate in accordance with the invention.

FIG. 3 illustrates a cross-sectional view of a discharge tube of the apparatus of FIG. 1 and a control circuit coupled thereto.

FIG. 4 is a block diagram of a metering system employing the device of FIG. 1 or FIG. 2.

DETAILED DESCRIPTION OF THE PRESENTLY PREFERRED EMBODIMENTS

In accordance with the method of the present invention, in order to measure gas flow volume or rate, gas bubbles of predeterminable and substantially equal size are formed and then counted. To this end, the preformed bubbles are caused to pass through a defined volume of liquid so they can be counted as they pass along a predetermined path. Thus, knowing the volume of each bubble, the bubble count can be used to calculate total gas flow volume. If a count is made within a defined time period, then a rate of flow can also be calculated.

As broadly contemplated, the method of the present invention contemplates measuring or metering the flow of a gas to or from a point of production of utilization by flowing the gas through a closed fluid circuit. At a first point in the fluid circuit, the gas is pressurized and then flows as a pressurized stream in the circuit. At a second point in the fluid circuit, the gas stream is converted into discrete separate bubbles of predictable size and volume within a body of liquid whereupon the bubble stream flows through a third point in the fluid circuit through which the bubbles flow in single file. Detection means at the third point, for example, photoelectric means, generate an electric signal which can be used as a controlling variable in actuating a counter or a metering device.

As will become clearer below, a variety of apparatus can be used to practice the steps of the method.

An exemplary form of the apparatus 10 for producing and measuring gas flow volume or rate according to this invention is illustrated in FIG. 1. The apparatus 10 includes a gas flow cell 12 that comprises two vertical, or near-vertical, tubes 14 and 16. The tubes 14 and 16 are interconnected in fluid communication by means of a transfer tube 18 to thus form a continuous conduit having somewhat of an overall U-shape.

In the embodiment illustrated in FIG. 1, the tubes 14, 16 and 18 are drilled or milled into a solid block 20. However, the tubes 14, 16 and 18 can, as an alternative, be formed by molding or casting, or by bending or welding stock tubular materials. Such materials include glass, metals, and plastics.

In the apparatus 10, the transfer tube 18 is oriented to have about a 45 degree downward incline from the tube 14 to the tube 16. This incline was chosen merely for illustration, prototype design, and testing purposes. However, it is to be understood that the incline of the tube can vary from between horizontal to essentially vertical.

The tubes 14, 16 and 18 are filled to a preset height with a suitable body of liquid 24. In a preferred embodiment, the liquid 24 used is a non-volatile liquid.

Attached to the gas flow cell 12 is a reaction vessel 26 within which gas can be produced, thereby operating as a source of gas under sufficient pressure so that a supply of gas may be driven in the form of a stream. It is to be understood that the vessel 26 is shown only schematically and such depiction is used only to represent any of a variety of biological, chemical or physical processes or devices that produce gas and may include pumping means for increasing the pressure of the gas sufficiently to flow the gas in the form of a stream. The vessel 26 is connected in fluid communication with a suitable inlet connector 28 at the top of the tube 14, e.g., via surgical tubing 30 through which the stream of pressurized gas is directed.

A section of the vertical tube 16 connected to the transfer tube 18 includes fittings or positions 32 and 34 in or at which a bubble sensor is installed. In the illustrated embodiment, the bubble sensor includes a light emitting source 36 and a light detector 38 (illustrated in FIG. 3) positioned on opposite sides of the tube 16. In a preferred embodiment, the light emitting source 36 is a light emitting device (LED) and the light detector 38 is a photo-sensitive device (PSD). However, other bubble sensors can comprise sonar sources, detectors, or mechanical devices.

The gas flow cell 12 functions as follows. A biological, chemical, or physical process or device that produces a gas 40, as represented by the reaction vessel 26 in FIG. 1, is connected to the inlet 28 of the flow cell 12.

The pressure of the gas 40 in the inlet tube 14 causes the liquid 24 to shift to the discharge tube 16 of the flow cell 12 via the transfer tube 18. When the pressure in the inlet tube 14 exceeds the liquid pressure-head in the discharge tube 16, bubbles of gas such as a bubble 42 form at a downstream end or tip 44 of the transfer tube 18. When the bubbles such as the bubble 42 break loose, they rise and pass between the LED 36 and the PSD 38. The sizes of the bubbles are predictably and substantially equal and defined in view of the pressure of the gas stream, the type of liquid used, the height of the liquid in the tubes 14 and 16 and the configuration of the cell.

Light transmits through bubbles at a different intensity than through the liquid 24. Therefore, the PSD 38 is caused to produce a voltage change whenever a bubble such as the bubble 42 passes between the LED 36 and PSD 38. The voltage change can be registered by a suitable electrical control circuit. Thus, the voltage changes can be counted to obtain a count of bubbles passing by the bubble sensor.

As discussed above, when the liquid pressure in the cell 12 is maintained constant—by controlling the height of the liquid level 56—the bubbles formed are of predictably predetermined and substantially equal volume. Thus, the volume of gas 40 released from the reaction vessel 26 is proportional to the volume of one bubble (V) times the number of bubbles (N) that are detected by the bubble sensor. The rate of gas flow is the volume of gas produced per unit of time (T), or (NV/T).

The flow cell 12 can also be used to measure gas consumed by a biological or chemical reaction as opposed to gas production. In this case, the gas-consuming device or reaction vessel is connected to an outlet 46 of the cell 12. The decrease in pressure or vacuum created by the gas consumption causes the liquid level in the discharge tube 16 to rise until a bubble forms at the downstream tip 44 of the transfer tube 18. The cumulative gas consumption volume is again expressed as the product of the number of bubbles (N) and the volume per bubble (V) passing by the sensor. The rate of gas flow is expressed as the volume consumed during a specified time interval or NV/T.

In one embodiment, the connectors 28 and 46 are secured to the top of the block 20 over the open tops of the tubes 14 and 16, but other methods of attachment may be used.

In FIG. 2 there is illustrated an alternate flow cell 50 that can be used instead of the flow cell 12. As illustrated, the flow 50 is very similar to the flow cell 12 and includes vertical inlet tube 52, a vertical discharge tube 54, and a transfer tube 56 providing fluid communication between the bottom ends of the inlet 52 and the discharge tube 54.

The flow cell 52 is not, however, formed by milling the tubes 52, 54, and 56 into a solid block. Instead, the tubes 52, 54, and 56 are formed by molding or bending a stock tubular material such as glass and/or plastics. Similar designs may be formed by welding tubular stock materials.

The transfer tube 56 is formed so as to be inclined or horizontal. The inlet tube 52 includes an inlet connector 58 to which can be attached a conduit 60. Similarly, the discharge tube 54 includes an outlet connector 62.

Further, a pair of fittings or positions 64 are placed in a vertical or near-vertical tube 66 connecting the lower end of the tube 54 with a discharge top or end 62 of the discharge tube 54. These positions 64 are used for receiving therein suitable light emitting and detecting devices that form a bubble sensor as described above.

In FIG. 3, the flow cell 12 is again illustrated in cross-sectional view to depict the positioning of the LED 36 and the PSD 38 relative to the discharge tube 16. Further, electrically coupled to the LED 36 and the PSD 38 is a control circuit 70. The control circuit 70 is illustrated only in block diagram form because it is understood that it may consist of any number of state-of-the-art devices that are capable of registering and accumulating the number of pulses produced by the photo-sensitive detector. Such devices include microprocessors, computers, etc. For example, a computer can be used as a substitute for or in conjunction with the control circuit to serve as a bubble counter and to permit automated adjustments for variations in the above-listed parameters.

A third application of a flow cell such as the flow cells 12 and 50 is as a gas metering device. In this situation, gas is applied under slight pressure to the inlet of the flow cell. The inlet flow rate is adjusted until the number of bubbles per unit of time (N/T) passing through the flow cell, times the volume of gas per bubble (V), i.e.

$$\frac{NV}{T},$$

is equal to the desired metered flow rate. The metered rate may be controlled manually or automatically by feedback control of an inlet valve between the gas source and the inlet to the flow cell using a control circuit.

In FIG. 4 there is illustrated in schematic form a gas metering device or system 80 using a flow cell in accordance with the invention. As illustrated, a gas production process, as represented by a gas reaction vessel 82, is coupled to a flow cell 84 via a fluid conduit 86. A suitable flow control valve 88 is interposed in the conduit 86 so as to be capable of regulating the flow of gas therethrough.

Connected to the valve 88 is a motor 90 that can be used to open and close the valve to any selected position in view of an electrical signal supplied thereto. To this end, a control circuit 92 is provided that is operative to supply such an electrical signal to the motor 90.

The control circuit 92 in turn is coupled to a light emitting source 94 and a light detecting device 96 positioned on or within the cell 84 so as to detect and count gas bubbles passing through the flow cell 84. Thus, as discussed above, the control circuit 92 can calculate the flow rate of gas passing through the flow cell 84 and can adjust the valve 88 to meter such flow rate in view of a predetermined flow rate.

PROTOTYPE TESTING

A number of prototype flow cells, such as the cell 12 illustrated in FIG. 1, were produced for testing purposes. These cells were calibrated by using a syringe to introduce gas at a number of controlled rates into sealed vessels representing biological or chemical reactors. The calibration revealed that cells of the same design, that is having the same physical size and shape and containing the same amounts of liquid, produced substantially equal volumes of gas in each bubble formed. These calibration results, as summarized in Table 1, show that the volume of each bubble averaged 0.221 milliliters with less than 1% coefficient of variability ($C_V$) among tests.

TABLE 1

| GAS FLOW CELL CALIBRATION | | | |
|---|---|---|---|
| Rate, mL/min | Volume, mL | Number of counts (bubbles) | Rating, mL/bubble |
| 6.1 | 33.2 | 150 | 0.2213 |
| 5.8 | 33.2 | 150 | 0.2213 |
| 3.8 | 80.3 | 365 | 0.2200 |
| 1.1 | 66.1 | 297 | 0.2226 |
| 0.5 | 25.9 | 116 | 0.2233 |
| 0.4 | 21.8 | 100 | 0.2180 |
| | | Average: | 0.2211 |
| | | Std. Dev.: | 0.0019 |
| | | Coef. Var.: | 0.86% |

Three prototype cells were connected to laboratory-scale anaerobic biological reactors that were operated under known and constant conditions so that the amount of gas produced daily would be the same in each reactor. A fourth reactor was set up to measure the gas produced by a manual time-consuming method. The results of these tests, summarized in Table 2, illustrate that essentially the same amount of gas was produced daily in each reactor. While some natural variation occurred between biological reactors, these tests also illustrate that the coefficient of variability ($C_V$) between daily gas production measurements was less when measuring gas flow with the prototype gas flow cells than when measuring the gas flow manually.

TABLE 2

| PROTOTYPE GAS FLOW CELL PERFORMANCE IN LABORATORY TESTS | | | | |
|---|---|---|---|---|
| | | Measured Gas Production Rate, milliliters/day | | |
| TIME, | | MANUAL METHOD | GAS FLOW CELL METHOD | |
| days | REACTOR→ | CONTROL | 1 | 2 | 3 |
| 1 | | 69.1 | 70.6 | 65.8 | 65.5 |
| 2 | | 67.8 | 73.6 | 67.5 | 69.7 |
| 3 | | 69.5 | 69.2 | 68.3 | 68.0 |
| 4 | | 68.5 | 72.8 | 70.0 | 72.5 |
| 5 | | 70.8 | 71.1 | 69.2 | 71.4 |
| 6 | | 70.0 | 68.6 | 68.6 | 70.1 |
| 7 | | 70.0 | 70.0 | 68.0 | 70.3 |
| 8 | | 73.0 | 69.7 | 70.8 | 71.6 |
| 9 | | 67.0 | 67.2 | 67.8 | 70.4 |
| 10 | | 66.0 | 79.4 | 76.2 | 79.4 |
| 11 | | 86.0 | 76.0 | 72.2 | 74.6 |
| 12 | | 73.0 | 71.4 | 70.8 | 71.4 |
| 13 | | 74.0 | 70.1 | 69.5 | 69.9 |
| 14 | | 76.0 | 73.7 | 71.0 | 73.1 |
| 15 | | 76.0 | 73.9 | 71.6 | 72.7 |
| 16 | | 72.6 | 71.0 | 70.6 | 70.8 |
| Average, mL | | 71.8 | 71.8 | 69.9 | 71.3 |
| Std. Dev., mL | | 4.8 | 3.1 | 2.4 | 3.0 |
| Coef. Var., % | | 6.7 | 4.2 | 3.4 | 4.2 |
| Minimum | | 66.0 | 68.6 | 65.8 | 65.5 |
| Maximum | | 86.0 | 79.4 | 76.2 | 74.6 |

While a preferred embodiment has been shown, modifications and changes may become apparent to those skilled in the art which shall fall within the spirit and scope of the invention. It is intended that such modifications and changes be covered by the attached claims.

We claim:

1. A gas flow measuring device comprising, in combination, a gas flow cell block having formed therein first and second vertical tubes interconnected at their lower most ends by an inclined reduced transfer tube, thereby to form a continuous conduit in said cell block of an overall U-shaped configuration, but with the bight portion of the U-shaped conduit oriented at about a 45° incline form the first tube to the second tube;

an inlet connector connected to the top of cell block in flow communication with said first tube; and an outlet connector connected to the top of said cell block in flow communication with said second tube;

a reaction vessel within which gas can be produced;

conduit means having valve controller means therein and extending from said reactor vessel to said inlet connector, said second vertical tube having a reduced section of predetermined cross-sectional size connected to said transfer tube and forming a bubble sensing station in said cell block, and a LED light emitting source in said cell block at said station on one side of said second vertical tube reduced section; and a photosensitive light detector (PSD) in said cell block at said station on the opposite side of said second vertical tube reduced section;

control circuit means electrically coupled and connected to said LED source and to said PSD detector for registering and accumulating the number of pulses produced by the PSD detector;

a charge of liquid in said cell block filling said first, second and transfer tubes with liquid up to a predetermined level;

whereby gas from said reaction vessel metered through said valve controller means to the inlet of said cell block forms single bubbles of predictably predetermined and substantially equal volume (V) which single bubbles are measurable in number of bubbles (N) per unit of time (T) by said control circuit means.

* * * * *